(12) United States Patent
Crawford et al.

(10) Patent No.: US 10,844,898 B1
(45) Date of Patent: Nov. 24, 2020

(54) ADJUSTABLE BRACKET ASSEMBLY

(71) Applicant: Orbit Irrigation Products, LLC, North Salt Lake, UT (US)

(72) Inventors: Bryce Taylor Crawford, Syracuse, UT (US); Stuart J. Eyring, Bountiful, UT (US)

(73) Assignee: Orbit Irrigation Products, LLC, North Salt Lake, UT (US)

( * ) Notice: Subject to any disclaimer, the term of this patent is extended or adjusted under 35 U.S.C. 154(b) by 286 days.

(21) Appl. No.: 16/020,495

(22) Filed: Jun. 27, 2018

(51) Int. Cl.
| | |
|---|---|
| F16M 11/06 | (2006.01) |
| F16C 11/04 | (2006.01) |
| F16M 13/02 | (2006.01) |
| F21S 8/04 | (2006.01) |
| F21W 131/107 | (2006.01) |
| E04D 13/158 | (2006.01) |

(52) U.S. Cl.
CPC ......... *F16C 11/045* (2013.01); *F16M 13/025* (2013.01); *F21S 8/043* (2013.01); *E04D 13/158* (2013.01); *F16M 11/06* (2013.01); *F21S 8/046* (2013.01); *F21W 2131/107* (2013.01)

(58) Field of Classification Search
USPC ... 248/222.51, 222.52, 229.1, 274.1, 288.11, 248/291.1, 292.14, 299.1, 298.1, 276.1, 248/279.1, 281.11, 284.1
See application file for complete search history.

(56) References Cited

U.S. PATENT DOCUMENTS

| | | | |
|---|---|---|---|
| 5,701,636 A | 12/1997 | Jahnke | |
| 6,264,152 B1* | 7/2001 | Bloch | F16M 11/126 248/274.1 |
| 6,709,184 B1* | 3/2004 | McDonald | F16M 11/06 248/222.51 |
| 7,152,836 B2* | 12/2006 | Pfister | F16C 11/103 248/292.14 |
| 7,954,777 B2* | 6/2011 | Bohm | F16M 11/10 248/274.1 |
| 7,954,780 B2* | 6/2011 | Dittmer | F16M 11/10 248/284.1 |
| 8,167,250 B2* | 5/2012 | White | H02G 3/0608 248/291.1 |
| 2007/0090250 A1* | 4/2007 | O'Keene | F16M 11/10 248/299.1 |
| 2009/0230271 A1* | 9/2009 | Grabania | F16M 11/18 248/299.1 |
| 2010/0224750 A1* | 9/2010 | Webber | H04R 1/026 248/288.11 |
| 2011/0315844 A1* | 12/2011 | Dittmer | F16M 11/041 248/284.1 |

* cited by examiner

*Primary Examiner* — Alfred J Wujciak
(74) *Attorney, Agent, or Firm* — Austin Rapp

(57) ABSTRACT

A bracket assembly is described. A center bracket may have two protrusions on a first leg portion and two protrusions on a second leg portion. The protrusions of the center bracket may be positioned and shaped to interface with arcuate guide slots on leg portions of a first bracket and a second bracket. Curvatures of the arcuate guide slots may be positioned and shaped to maintain the center bracket longitudinal axis at substantially the same angle with respect to the first bracket longitudinal axis as the center bracket longitudinal axis is with respect to the second bracket longitudinal axis as the first bracket and second bracket pivot over a range of angles about a point of rotation in an assembled configuration.

17 Claims, 14 Drawing Sheets

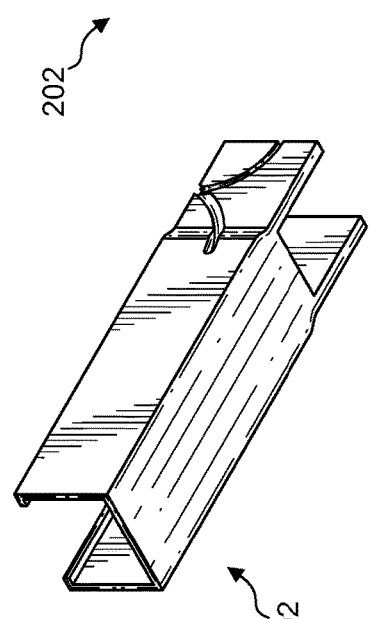
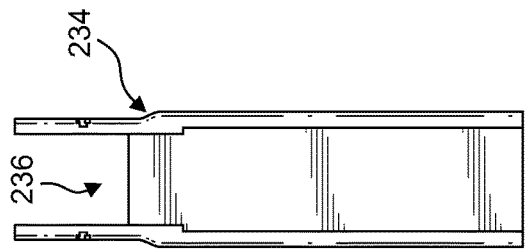
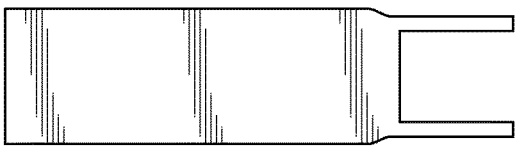
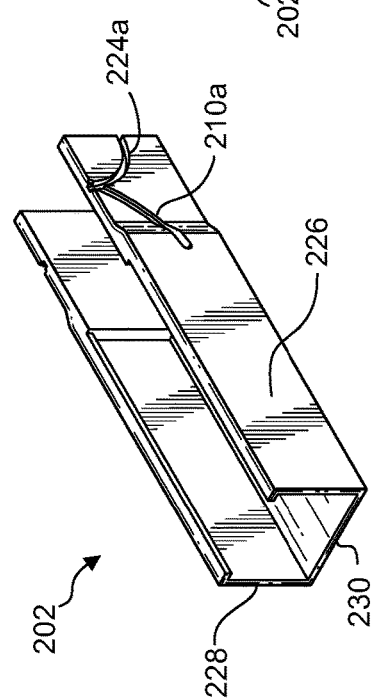
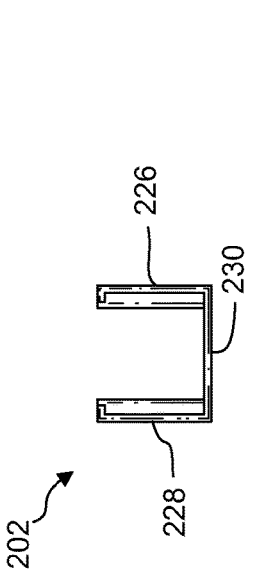
FIG. 2A  FIG. 2B  FIG. 2C
FIG. 2D  FIG. 2E  FIG. 2F
FIG. 2G  FIG. 2H

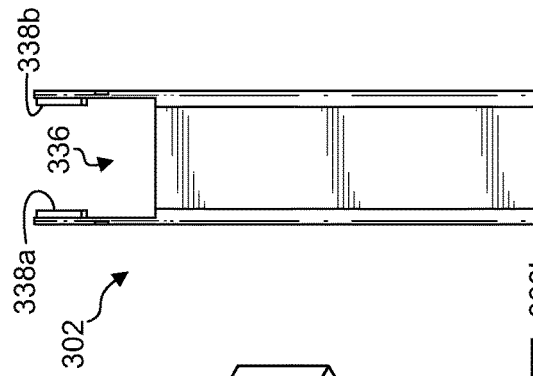
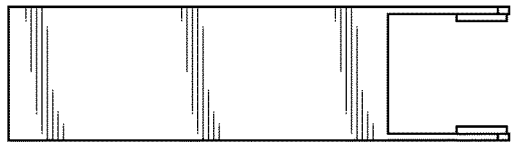
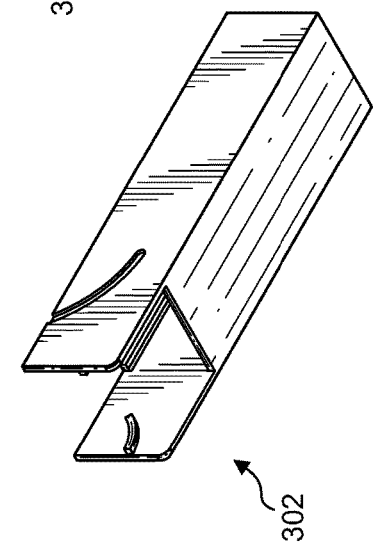
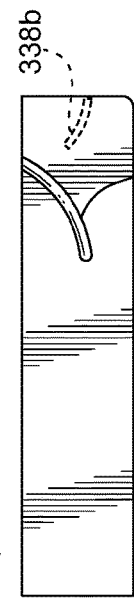
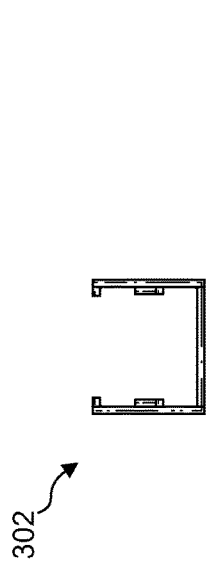
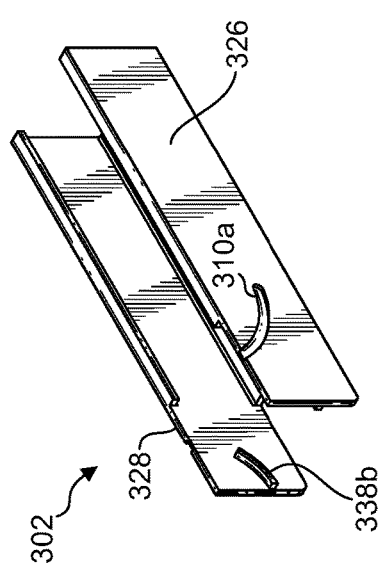
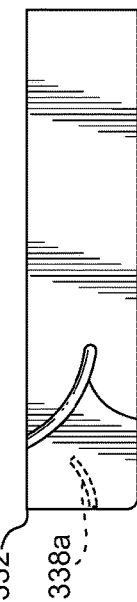
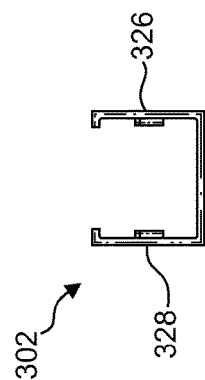

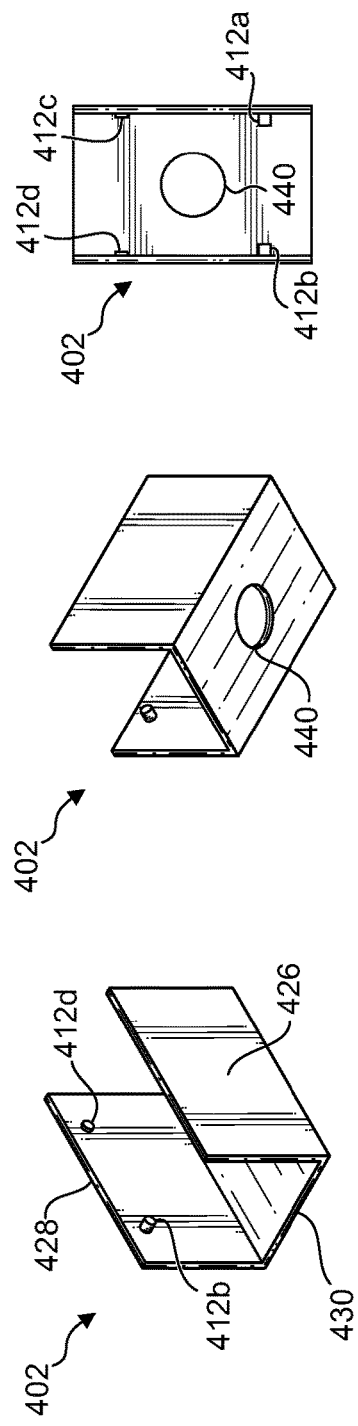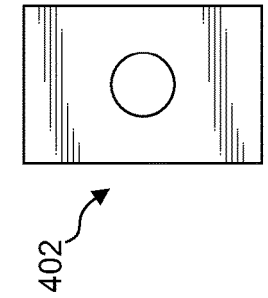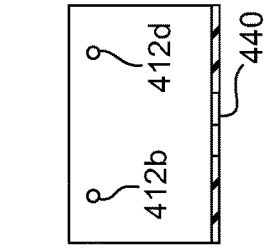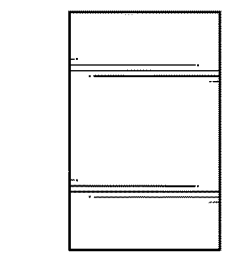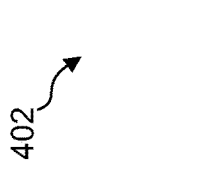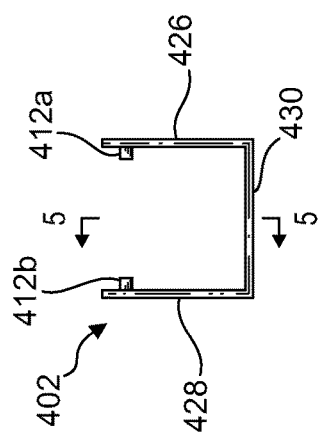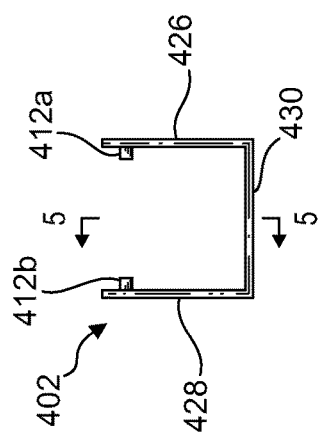

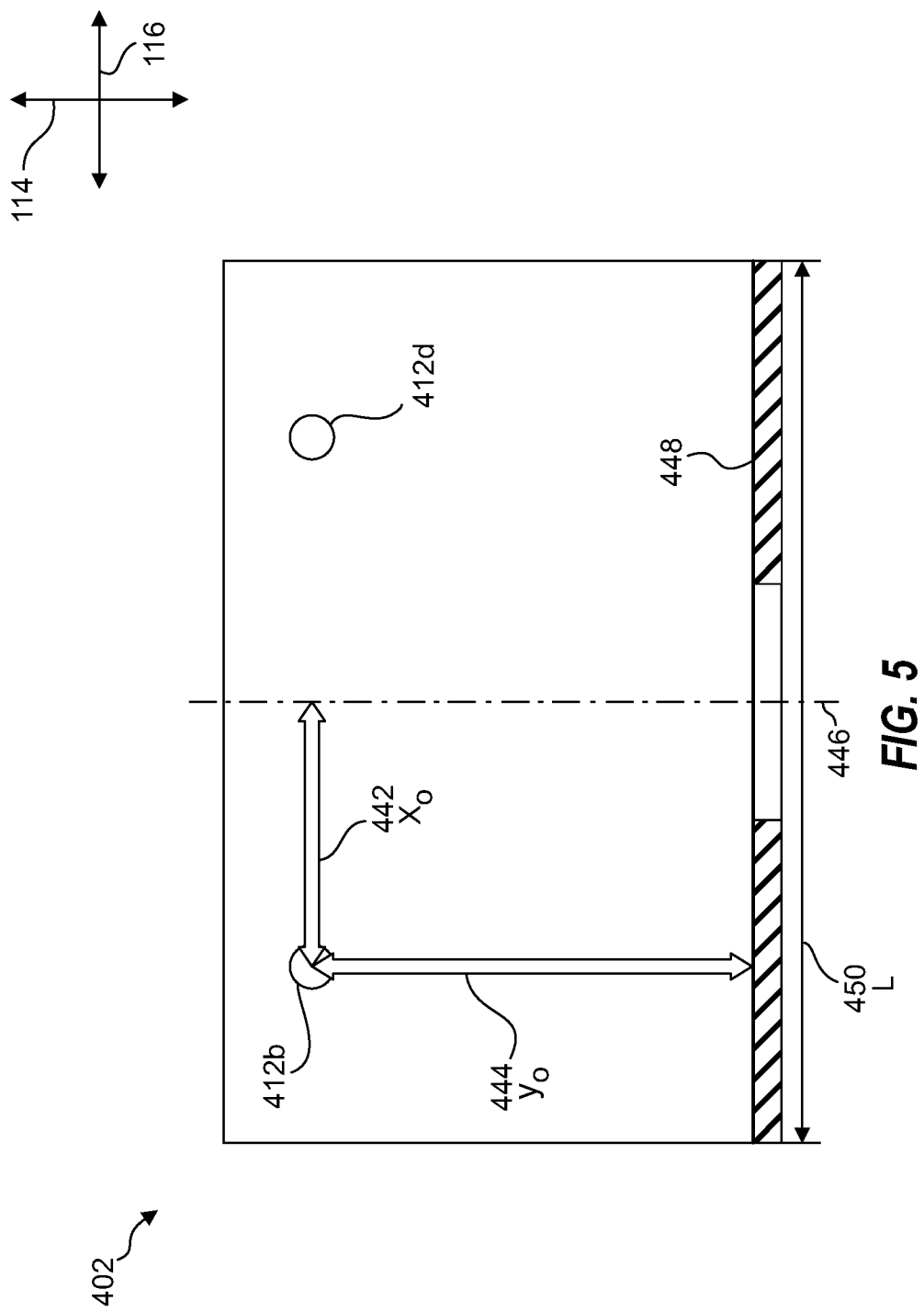

ADJUSTABLE BRACKET ASSEMBLY

TECHNICAL FIELD

The present invention relates generally to brackets. More specifically, the present invention relates to an adjustable bracket assembly.

BACKGROUND

Bracket assemblies may be used for various support and/or reinforcement applications. For example, bracket assemblies may be used to provide strength to structures. In other applications, a bracket assembly may be used to support an applied load. For example, a bracket assembly may be attached to a structure and one or more objects may then be attached to the bracket assembly.

In an example, one or more bracket assemblies may be used with event lighting. In event lighting, lighting may then be installed on a bracket assembly and the bracket assembly may be installed on a structure, such as home. Multiple bracket assemblies may interconnect to form a lighting assembly.

One challenge with bracket assemblies is accommodating varying angles of installation. For example, in the event lighting application, a roof may have one or more peaks. Each of the peaks may have a certain angle, which may or may not be the same as the other peaks. Therefore, the ability to adjust a bracket assembly to accommodate different angles is important.

Accordingly, for these and other reasons, improved apparatuses and methods for an adjustable bracket assembly are desirable.

SUMMARY

Embodiments of the disclosed subject matter are provided below for illustrative purposes and are in no way limiting of the claimed subject matter.

A bracket assembly is described. The bracket assembly may include a first bracket having a first bracket longitudinal axis and having a first arcuate groove on a first leg portion and a second arcuate groove on a second leg portion. The bracket assembly may also include a second bracket having a second bracket longitudinal axis and having a first protrusion on a first leg portion and a second protrusion on a second leg portion. The first protrusion may be positioned and shaped to interface with the first arcuate groove and the second protrusion may be positioned and shaped to interface with the second arcuate groove to allow the first bracket longitudinal axis and the second bracket longitudinal axis to pivot over a range of angles about a point of rotation in an assembled configuration. The bracket assembly may also include a center bracket having a center bracket longitudinal axis and having two protrusions on a first leg portion and two protrusions on a second leg portion. The protrusions of the center bracket may be positioned and shaped to interface with arcuate guide slots on the first bracket and second bracket. Curvatures of the arcuate guide slots may be positioned and shaped to maintain the center bracket longitudinal axis at substantially a same angle with respect to the first bracket longitudinal axis as the center bracket longitudinal axis is with respect to the second bracket longitudinal axis over the range of angles between the first bracket and second bracket longitudinal axes in the assembled configuration.

The arcuate grooves of the first bracket may include circular arcs with a radius centered at a pivot corner of the first bracket located opposite a first bracket web portion. The protrusions of the second bracket may be located from a pivot corner of the second bracket located opposite a second bracket web portion at a distance corresponding to the radius of the circular arcs of the arcuate grooves of the first bracket. The protrusions of the second bracket may include arcuate protrusions having the radius of the circular grooves of the arcuate grooves of the first bracket.

A first protrusion of the center bracket may interface with an arcuate guide slot on the first leg portion of the first bracket. A second protrusion of the center bracket may interface with an arcuate guide slot on the second leg portion of the first bracket. A third protrusion of the center bracket may interface with an arcuate guide slot on the first leg portion of the second bracket. A fourth protrusion of the center bracket may interface with an arcuate guide slot on the second leg portion of the second bracket.

The curvatures of the arcuate guide slots may be further positioned and shaped to maintain a center bracket web portion of the center bracket in contact with web portions of the first bracket and second bracket. At least a portion of the first bracket and second bracket comprise a C-shaped channel.

The range of angles of the pivot of the first bracket and second bracket at the point of rotation may include substantially 90 degrees to 180 degrees. At 90 degrees, the first bracket longitudinal axis and the second bracket longitudinal axis may be substantially perpendicular. At 180 degrees, the first bracket longitudinal axis and the second bracket longitudinal axis may be substantially coaxial.

The center bracket may include one or more openings shaped to receive one or more lights. The first bracket and the second bracket may be shaped to engage a mounting bracket, the mounting bracket being attachable to a roof overhang. In an installed configuration, the first bracket and the second bracket may be adjustable to accommodate an angle of a peak of a roof structure.

The first leg portion and the second leg portion of the first bracket may include an offset within the first bracket to accommodate the first leg portion and the second leg portion of the second bracket. Two of the protrusions of the center bracket may be shaped to be longer than two of the other two protrusions of the center bracket to interface with the arcuate guide slots on the offset of the first bracket.

In some embodiments, the center bracket may be shaped to interface with the arcuate guide slots on an exterior surface of the first bracket and the second bracket. The protrusions of the center bracket may be located on an interior of the center bracket.

In some embodiments, the center bracket may be shaped to interface with the arcuate guide slots on an interior surface of the first bracket and the second bracket. The protrusions of the center bracket may be located on an exterior of the center bracket.

A method using the bracket assembly is also described. The method may include pivoting the first bracket and the second bracket about the point of rotation in the assembled configuration to an angle within the range of angles. The method may also include maintaining, by the curvatures of the arcuate guide slots, the center bracket longitudinal axis at substantially the same angle with respect to the first bracket longitudinal axis as the center bracket longitudinal axis is with respect to the second bracket longitudinal axis over the range of angles between the first bracket and second bracket longitudinal axes. The method may further include altering the angle between the first bracket and the second bracket within the range of angles without disassembling the first bracket, the second bracket and the center bracket.

Thus, embodiments of the disclosed subject matter provide simple and effective adjustable bracket assemblies that may be used on a wide variety of installation angles.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 2A is a top perspective view of a first bracket of the bracket assembly.

FIG. 2B is a bottom perspective view of the first bracket of the bracket assembly.

FIG. 2C is a top side view of the first bracket of the bracket assembly.

FIG. 2D is a front side elevational view of the first bracket of the bracket assembly.

FIG. 2E is a rear side elevational view of the first bracket of the bracket assembly.

FIG. 2F is a bottom side view of the first bracket of the bracket assembly.

FIG. 2G is a right side elevational view of the first bracket of the bracket assembly.

FIG. 2H is a left side elevational view of the first bracket of the bracket assembly.

FIG. 3A is a top perspective view of a second bracket of the bracket assembly.

FIG. 3B is a bottom perspective view of the second bracket of the bracket assembly.

FIG. 3C is a top side view of the second bracket of the bracket assembly.

FIG. 3D is a front side elevational view of the second bracket of the bracket assembly.

FIG. 3E is a rear side elevational view of the second bracket of the bracket assembly.

FIG. 3F is a bottom side view of the second bracket of the bracket assembly.

FIG. 3G is a right side elevational view of the second bracket of the bracket assembly.

FIG. 3H is a left side elevational view of the second bracket of the bracket assembly.

FIG. 4A is a top perspective view of a center bracket of the bracket assembly.

FIG. 4B is a bottom perspective view of the center bracket of the bracket assembly.

FIG. 4C is a top side view of the center bracket of the bracket assembly.

FIG. 4D is a front side elevational view of the center bracket of the bracket assembly.

FIG. 4E is a cross-sectional view of the center bracket of the bracket assembly of FIG. 4G taken across the line 4E-4E in FIG. 4G.

FIG. 4F is a bottom side view of the center bracket of the bracket assembly.

FIG. 4G is a right side elevational view of the center bracket of the bracket assembly.

FIG. 4H is a left side elevational view of the center bracket of the bracket assembly.

FIG. 5 is a cross-sectional view of the center bracket of FIG. 4H taken across the line 5-5 in FIG. 4H demonstrating an embodiment for positioning protrusions for interfacing with the arcuate guide slots.

Figure 1:
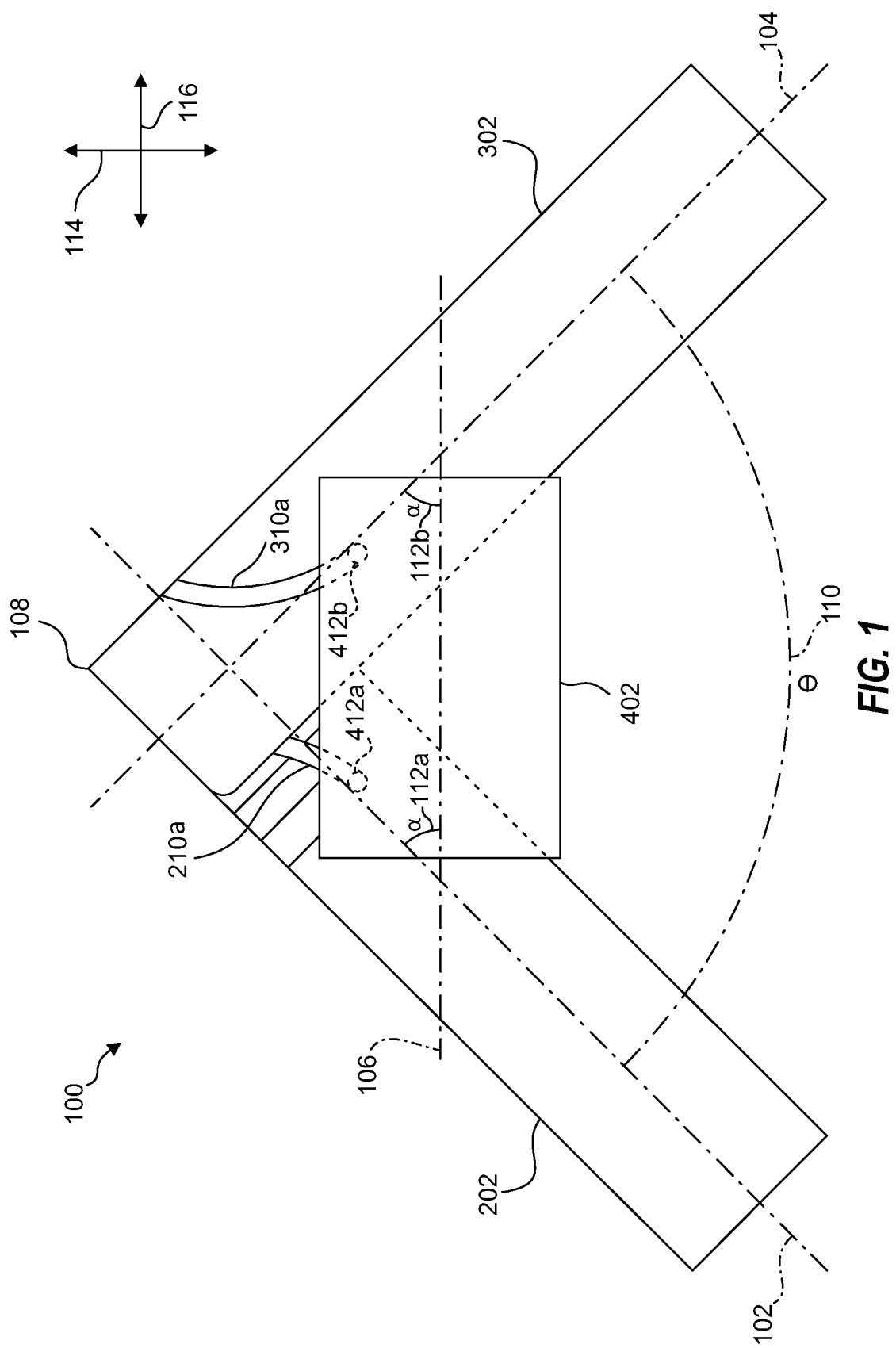
FIG. 1 is a front view of a bracket assembly in an assembled configuration according to one embodiment of the invention.

In this application, all of the figures are drawn to scale, that is, components and portions within each drawing are to scale, although a comparison of components between drawings is not necessarily to scale. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

As used in this application, the phrases "an embodiment" or "in one embodiment" or the like do not refer to a single, specific embodiment of the disclosed subject matter. Instead, these phrases signify that the identified portion or portions of the disclosed subject matter may be combined with other aspects of the disclosure without limitation.

For this application, the phrases "connected to," "coupled to," and "in communication with" refer to any form of interaction between two or more entities, including mechanical, electrical, magnetic, electromagnetic, and thermal interaction and may also include integral formation. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanisms. The term "abut" refers to items that are in direct physical contact with each other, although the items may be attached, secured, fused, or welded together. The terms "integrally formed" refer to a body that is manufactured integrally, i.e., as a single piece, without requiring the assembly of multiple pieces. Multiple parts may be integrally formed with each other if they are formed from a single workpiece.

As used herein, the term "substantially" indicates that a particular item is within 10° of a specified orientation or value. As used herein, the term "generally" indicates that a particular value is within 15% of a specified value.

The terms "proximal" and "distal" generally refer to parts or regions that are, respectively, closer to or further from the center of an object or system. A "proximal end" of an object may be the end that is maintained closer to the body of a user or a larger object to which the first object is coupled. Conversely, a "distal end" of an object may be the end that is maintained further from the body of a user or a larger object to which the first object is coupled.

An "anchoring element" is any structure that serves to anchor two other items together. Anchoring elements can use any known attachment scheme, including but not limited to various forms of mechanical fastening, welding, adhesive or chemical bonding, and the like.

In the figures, certain components may appear many times within a particular drawing. However, only certain instances of the component may be identified in the figures to avoid unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

FIG. 1 is a front view of a bracket assembly 100 in an assembled configuration according to one embodiment of the invention. For clarity, a height axis 114 and a width axis 116 are illustrated for the bracket assembly 100 in the assembled configuration.

Brackets may be used for various support and/or reinforcement applications. For example, brackets may be used to provide strength to structures. Examples of brackets include various structural shapes (e.g., bars, rounds, tubes, channels, etc.). Brackets may also include an assembly of discrete pieces that, together, act as a unit to provide strength and/or support to a structure. Brackets may be formed from various processes, such as a milling process, an extrusion process, a 3D printing process or a combination of the foregoing processes. In one embodiment, the brackets may be formed using an extrusion process followed by a milling process.

In other applications, a bracket may be used to support an applied load. For example, a bracket may be attached to a structure and one or more objects may then be attached to the bracket.

An example of a load support application in which a bracket may be used is event lighting. In event lighting, lighting may be installed on a bracket and the bracket may be installed on a structure. In some embodiments, the bracket may be a channel having one or more openings in which lighting (e.g., LED lights, incandescent bulbs, etc.) may be mounted. In these embodiments, the electrical wiring of the lighting may be routed through the channel to conceal the wiring from view and to protect the lighting from environmental conditions (e.g., wind, rain, sunlight, ice, snow). Multiple brackets may interconnect to form a lighting assembly.

The brackets may be shaped to mount to a part of a structure. In some embodiments, the brackets may be shaped to attach to the roof of a building. For example, mounting clips may attach to the soffit or fascia of a roof. The mounting clips may then attach to the bracket. An example of this type of roof assembly is described in connection with FIG. 12 and FIG. 13.

One challenge with brackets is accommodating varying angles of installation. For example, in the event lighting application, a roof may have one or more peaks. A roof peak may be relatively flat or may have a sharp angle. The angle of a flat roof peak may be approximately 180 degrees. In other words, the angle formed by the peak of a flat roof may be substantially coaxial. The angle of a pitched roof peak, on the other hand, may be any angle (e.g., between 90 degrees and 180 degrees).

In some approaches, brackets are cut and/or bent to accommodate various angles of installation. For example, a channel may be partially cut and bent to the angle of a roof peak. In another example, brackets may be miter cut and bonded (e.g., glued, welded, screwed) together to conform to the angle of a roof peak. However, these approaches may be expensive, time-consuming, challenging to properly execute and/or may result in an unsightly final appearance.

Furthermore, in many applications, it is beneficial to maintain a surface on a bracket at a particular angle and orientation (e.g., level with respect to the ground) over a range of possible installation angles. For example, in the event lighting application, it may be desirable to install a light in the center of the roof peak. However, accommodating the variety of roof peak angles is challenging. Typically, brackets may be produced in fixed angle increments. For example, fixed 90-degree or 45-degree elbow brackets may be manufactured and used. However, these standard shapes do not offer enough flexibility to accommodate the vast range of roof peak angles. Furthermore, these elbow brackets do not offer a convenient mounting location in the center of the peak. As can be observed by this discussion, an adjustable bracket assembly that maintains a mounting location at a particular angular orientation over a range of adjusted angles would be beneficial.

The bracket assembly 100 described herein may address one or more of the foregoing issues. As used herein, an "assembly" is a plurality of discrete pieces that operate as a single unit. The bracket assembly 100 includes a first bracket 202, a second bracket 302 and a center bracket 402. The bracket assembly 100 is depicted in FIG. 1 in an assembled configuration. The first bracket 202 may include a first bracket longitudinal axis 102. The second bracket 302 may include a second bracket longitudinal axis 104. The center bracket 402 may include a center bracket longitudinal axis 106.

Referring to FIGS. 2A-2H, the first bracket 202 may include a first leg portion 226 and a second leg portion 228 that are connected by a web portion 230. In some embodiments, the first bracket 202 may have a cross-sectional shape of a channel having an opening opposite the web portion 230. In some embodiments, the channel may be a C-shaped channel having flanges located on each leg portion 226, 228 opposite the web portion 230. In some embodiments, the channel may be a U-shaped channel without flanges on the leg portions 226, 228.

In other embodiments, the first bracket 202 may have a cross-sectional shape without an opening opposite the web portion 230. For example, the first bracket 202 may have a box or tube cross-sectional shape.

As used herein, "web portion" or "web" refers to the material connecting leg portions of a bracket. In some embodiments, the web portion may be generally solid and without openings. In other embodiments, the web portion may include a plurality of openings. For example, the web portion may form a lattice.

The first bracket 202 may be formed from a generally rigid material. For example, the first bracket 202 may be made from plastic (e.g., ABS, PVC, or any type of plastic capable of being injection molded), metal (e.g., aluminum, tin, and/or stainless steel), wood and/or composite material. If made from metal, the first bracket 202 may be cast, milled, or bent to the appropriate shape. In various embodiments, the thickness of the material (such as metal) may be 10-20 gauge, being 14 gauge in one embodiment.

The first bracket 202 may have a first arcuate groove 224a on the first leg portion 226 and a second arcuate groove 224b on the second leg portion 228. The arcuate grooves 224a-b of the first bracket 202 may be circular arcs with a radius centered at a pivot corner 232 of the first bracket 202 located opposite the first bracket web portion 230.

Referring to FIGS. 3A-3H, the second bracket 302 may include a first leg portion 326 and a second leg portion 328 that are connected by a web portion 330. In some embodiments, the second bracket 302 may have a cross-sectional shape of a channel having an opening opposite the web portion 330. In some embodiments, the channel may be a C-shaped channel having flanges located on each leg portion 326, 328 opposite the web portion 330. In some embodiments, the channel may be a U-shaped channel without flanges on the leg portions 326, 328.

In other embodiments, the second bracket 302 may have a cross-sectional shape without an opening opposite the web portion 230. For example, the second bracket 302 may have a box or tube cross-sectional shape.

The second bracket 302 may be formed from a generally rigid material. For example, the second bracket 302 may be made from plastic (e.g., ABS, PVC, or any type of plastic capable of being injection molded), metal (e.g., aluminum, tin, and/or stainless steel), wood and/or composite material. If made from metal, the second bracket 302 may be cast, milled, or bent to the appropriate shape. In various embodiments, the thickness of the material (such as metal) may be 10-20 gauge, being 14 gauge in one embodiment.

The second bracket 302 may have a first protrusion 338a on the first leg portion 326 and a second protrusion 338b on the second leg portion 328. The protrusions 338a-b of the second bracket 302 may lie on a radius centered at a pivot corner 332 of the second bracket 302 located opposite a second bracket web portion 330.

The first protrusion 338a of the second bracket 302 may be positioned and shaped to interface with the first arcuate groove 224a of the first bracket 202. The second protrusion 338b of the second bracket 302 may be positioned and shaped to interface with the second arcuate groove 224b of the first bracket 202. The first and second protrusions 338a-b of the second bracket 302 may allow the first bracket longitudinal axis 102 and the second bracket longitudinal axis 104 to pivot over a range of angles ($\theta$) 110 (illustrated in FIG. 1) about a point of rotation 108 in the assembled configuration. In other words, the protrusions 338a-b of the second bracket 302 may slide within the arcuate grooves 224a-b of the first bracket 202 such that the first bracket 202 and the second bracket 302 pivot about the point of rotation 108.

In some embodiments, the range of angles ($\theta$) 110 of the pivot of the first bracket 202 and the second bracket 302 at the point of rotation 108 may be substantially 90 degrees to substantially 180 degrees. When the angle ($\theta$) 110 is 90 degrees, the first bracket longitudinal axis 102 and the second bracket longitudinal axis 104 may be substantially perpendicular. When the angle ($\theta$) 110 is 180 degrees, the first bracket longitudinal axis 102 and the second bracket longitudinal axis 104 may be substantially coaxial.

The protrusions 338a-b of the second bracket 302 may be located from a pivot corner 332 of the second bracket 302 located opposite the second bracket web portion 330 at a distance corresponding to the radius of the arcuate grooves 224a-b of the first bracket 202. When the protrusions 338a-b of the second bracket 302 are inserted into the arcuate grooves 224a-b of the first bracket 202 in the assembled configuration, the first bracket 202 and the second bracket 302 may pivot about the point of rotation 108 over a range of angles ($\theta$) 110. In the assembled configuration, the pivot corner 232 of the first bracket 202 and the pivot corner 332 of the second bracket 302 may align at the point of rotation 108.

In some embodiments, the protrusions 338a-b of the second bracket 302 may be arcuate protrusions having the radius of the arcuate grooves 224a-b of the first bracket 202. In other words, the protrusions 338a-b may be defined as a segment of a circular arc. In other embodiments (not shown), the cross-sectional shape of the protrusions 338a-b may be circular, square, oval or other shapes.

Referring again to FIGS. 2A-2H, the first bracket 202 may include an offset 234 to accommodate the second bracket 302 in the assembled configuration. In some embodiments, the first leg portion 226 and the second leg portion 228 of the first bracket 202 may include an offset 234 within the first bracket 202 to accommodate the first leg portion 326 and the second leg portion 328 of the second bracket 302. In other words, the leg portions 226, 228 of the first bracket 202 may be offset 234 within the interior of the first bracket 202. In other embodiments (not shown), the offset 234 may be on the second bracket 302.

In some embodiments, the first bracket 202 and/or the second bracket 302 may include a notch to accommodate rotation of the first bracket 202 and the second bracket 302 about the point of rotation 108 in the assembled configuration. For example, the web portion 230 of the first bracket 202 may be set back a certain distance to form an open space 236 between the leg portions 226, 228 of the first bracket 202. Similarly, the web portion 330 of the second bracket 302 may be set back a certain distance to form an open space 336 between the legs 326, 328 of the second bracket 302.

In some embodiments, at least a portion of the first bracket 202 and/or the second bracket 302 may be formed from a channel of various shapes (e.g., bars, rounds, tubes, channels, etc.). For example, a portion of the first bracket 202 and/or the second bracket 302 may comprise a C-shaped channel. The brackets 202, 302 may be formed from various processes, such as a milling process, an extrusion process, a 3D printing process or a combination of the foregoing processes. In various embodiments, the brackets 202, 302, may be formed using an extrusion process followed by a milling process.

Referring now to FIGS. 4A-4H, the center bracket 402 may have a first leg portion 426 and a second leg portion 428 that are connected by a web portion 430. In some embodiments, the center bracket 402 may have a cross-sectional shape of a channel having an opening opposite the web portion 430. In some embodiments, the center bracket 402 may be a U-shaped channel without flanges on the leg portions 426, 428.

The center bracket 402 may be formed from a generally rigid material. For example, the center bracket 402 may be made from plastic (e.g., ABS, PVC, or any type of plastic capable of being injection molded), metal (e.g., aluminum, tin, and/or stainless steel), wood and/or composite material. If made from metal, the second bracket 402 may be cast, milled, or bent to the appropriate shape. In various embodiments, the thickness of the material (such as metal) may be 10-20 gauge, being 14 gauge in one embodiment.

The center bracket 402 may have two protrusions 412a, 412c on the first leg portion 426 and two protrusions 412b, 412d on the second leg portion 428. The protrusions 412a-d of the center bracket 402 may be positioned and shaped to interface with arcuate guide slots 210a-b on the first bracket 202 and arcuate guide slots 310a-b on the second bracket 302. The protrusions 412a-d may also be referred to as guide pins. The center bracket protrusions 412a-d may have circular, square, oval or other cross-sectional shapes.

Referring again to FIGS. 2A-2H, the first bracket 202 may include a first arcuate guide slot 210a on the first leg portion 226 and a second arcuate guide slot 210b on the second leg portion 228. Referring now to FIGS. 3A-3H, the second bracket 302 may include a first arcuate guide slot 310a on the first leg portion 326 and a second arcuate guide slot 310b on the second leg portion 328. The arcuate guide slots 210a-b, 310a-b may be shaped and positioned to interface with the center bracket protrusions 412a-d. For example, the arcuate guide slots 210a-b, 310a-b may be slots, channels or grooves that are sized to allow the center bracket protrusions 412a-d to sit inside (or, alternatively, outside) the arcuate guide slots 210a-b, 310a-b.

Each of the four protrusions 412a-d of the center bracket 402 may be positioned and shaped to interface with either a corresponding arcuate guide slot 210a-b on the first bracket 202 or an arcuate guide slot 310a-b on the second bracket 302. Referring to FIG. 1, a first protrusion 412a of the center bracket 402 may interface with an arcuate guide slot 210a on the first leg portion 226 of the first bracket 202. A second protrusion 412b of the center bracket 402 may interface with an arcuate guide slot 210b on the second leg portion 228 of the first bracket 202. A third protrusion 412c of the center bracket 402 may interface with an arcuate guide slot 310a on the first leg portion 326 of the second bracket 302. A fourth protrusion 412d of the center bracket 402 may interface with an arcuate guide slot 310b on the second leg portion 328 of the second bracket 302.

In some embodiments, the center bracket leg portions 426, 428 may be sufficiently flexible to allow the protrusions 412a-d of the center bracket 402 to be seated on the arcuate guide slots 210a-b, 310a-b. However, the center bracket leg portions 426, 428 may be sufficiently rigid such that once seated over the first bracket 202 and the second bracket 302 in the arcuate guide slots 210a-b, 310a-b, the center bracket 402 may remain in place. In some embodiments, the center bracket 402 may be shaped to clamp onto the first bracket 202 and the second bracket 302 to generate an amount of friction to help keep the first bracket 202 and the second bracket 302 at an adjusted angle (θ) 110.

Two of the protrusions 412a, 412b of the center bracket 402 may be shaped to be longer than two of the other two protrusions 412c, 412d of the center bracket 402. The longer protrusions 412a, 412b may interface with arcuate guide slots 210a-b on the offset 234 of the first bracket 202. In other words, to accommodate the offset 234 in the first bracket 202, the two protrusions 412a, 412b that interface with the arcuate guide slots 210a-b of the first bracket 202 may be longer than the two protrusions 412c, 412d that interface with the arcuate guide slots 310a-b of the second bracket 302.

In some embodiments, the center bracket 402 may be shaped to interface with the arcuate guide slots 210a-b, 310a-b on an exterior surface of the first bracket 202 and the second bracket 302. In these embodiments, the protrusions 412a-d of the center bracket 402 may be located on an interior of the center bracket 402 (as shown in FIGS. 4A-4H).

In other embodiments (not shown), the center bracket 402 may be shaped to interface with the arcuate guide slots 210a-b, 310a-b on an interior surface of the first bracket 202 and the second bracket 302. In these embodiments, the protrusions 412a-d of the center bracket 402 may be located on an exterior of the center bracket 402.

Curvatures of the arcuate guide slots 210a-b, 310a-b may be positioned and shaped to maintain the center bracket longitudinal axis 106 at substantially the same angle (α) 112a-b (shown in FIG. 1) with respect to the first bracket longitudinal axis 102 as the center bracket longitudinal axis 106 is with respect to the second bracket longitudinal axis 104 over the range of angles (θ) 110 between the first bracket longitudinal axis 102 and second bracket longitudinal axis 104 in the assembled configuration. Examples of how the curvatures of the arcuate guide slots 210a-b, 310a-b may be defined to maintain the same angle (α) 112a-b over the range of angles (θ) 110 are described in connection with FIGS. 5 and 6.

In some embodiments, the curvatures of the arcuate guide slots 210a-b, 310a-b may be further positioned and shaped to maintain the center bracket web portion 430 of the center bracket 402 generally in contact with the web portion 230 of the first bracket 202 and the web portion 330 of the second bracket 302. For example, as the first bracket 202 and the second bracket 302 are adjusted to pivot about the point of rotation 108, the arcuate guide slots 210a-b, 310a-b may cause edges of the center bracket web portion 430 to remain generally in contact with the web portions 230, 330 of the first bracket 202 and the second bracket 302.

The first bracket 202 and the second bracket 302 may be pivoted about the point of rotation 108 in the assembled configuration to an angle (θ) 110 within the range of angles (θ) 110. Because of the curvatures of the arcuate guide slots 210a-b, 310a-b, the center bracket longitudinal axis 106 may be maintained at substantially the same angle (α) 112a-b with respect to the first bracket longitudinal axis 102 as the center bracket longitudinal axis 106 is with respect to the second bracket longitudinal axis 104 over the range of angles (θ) 110 between the first bracket and second bracket longitudinal axes 102, 104.

Because the angle (α) 112a between the center bracket longitudinal axis 106 and the first bracket longitudinal axis 102 remains the same as the angle (α) 112b between the center bracket longitudinal axis 106 and the second bracket longitudinal axis 104, the web portion 430 of the center bracket 402 remains in the same plane over the range of angles (θ) 110. In other words, the web portion 430 of the center bracket 402 remains level as the angle (θ) 110 of the first bracket 202 and the second bracket 302 changes.

It should be noted that the angle (θ) 110 between the first bracket 202 and the second bracket 302 may be altered within the range of angles (θ) 110 without disassembling the first bracket 202, the second bracket 302 and the center bracket 402. For example, a user may adjust the angle (θ) 110 between the first bracket 202 and the second bracket 302 without having to remove the center bracket 402. Instead, the center bracket 402 may follow the arcuate guide slots 210a-b, 310a-b and move with the first bracket 202 and the second bracket 302.

In some embodiments, the first bracket 202 and the second bracket 302 may be shaped to attach to a roof overhang. For example, mounting brackets may attach to the soffit or fascia of a roof. The mounting brackets may then attach to the first bracket 202 and/or the second bracket 302. Examples of an installed configuration are described in connection with FIGS. 12-14.

In an installed configuration, the first bracket 202 and the second bracket 302 are adjustable to accommodate an angle of a peak of a roof structure. For example, if the angle of a roof peak is 90 degrees, the angle (θ) 110 between the first bracket 202 and the second bracket 302 may be adjusted to 90 degrees to accommodate the roof peak. In another example, if the angle of a roof peak is 135 degrees, the angle (θ) 110 between the first bracket 202 and the second bracket 302 may be adjusted to 135 degrees to accommodate the roof peak. Examples of the bracket assembly 100 adjusted to different angles (θ) 110 are depicted in FIGS. 7A-11B.

In some embodiments, the center bracket 402 may include one or more openings 440 shaped to receive one or more lights. For example, in an event lighting application, one or more lights (e.g., LEDs) may be mounted in the one or more openings 440 of the center bracket. It should be noted that because the center bracket web portion 430 remains level over the range of angles (θ) 110, the one or more lights mounted to the center bracket 402 will point in the same direction. In other words, no matter the angle (θ) 110 of the first bracket 202 and the second bracket 302, a light mounted on the center bracket 402 will remain parallel to the ground. Thus, the light will shine straight down. The curvature of the arcuate guide slots 210a-b, 310a-b may keep the center bracket web portion 430 horizontal with respect to the ground as the first bracket 202 and the second bracket 302 hinge to accommodate a steeper or a shallower angle (θ) 110. Furthermore, the curvature of the arcuate guide slots 210a-b, 310a-b may cause the center bracket web portion 430 to ride against the web portions 230, 330 of the first bracket 202 and the second bracket 302 over the range of angles (θ) 110, thus minimizing gaps between the center bracket 402, the first bracket 202 and the second bracket 302.

FIG. 5 is a section view of the center bracket 402 demonstrating an embodiment for positioning protrusions 412a-d for interfacing with the arcuate guide slots 210a-b, 310a-b. As described above, the protrusions 412a-d may be shaped and positioned to interface with the arcuate guide slots 210a-b, 310a-b of the first bracket 202 and the second bracket 302 of the bracket assembly 100.

The center bracket 402 may be defined with a centerline 446 that passes through the center of the center bracket 402 perpendicular to the center bracket longitudinal axis 106. The length (L) 450 of the center bracket 402 may be the length from the lateral edges of the center bracket 402.

The location of a given protrusion 412a-d on a leg portion 426, 428 of the center bracket 402 may be defined in terms of distances from the centerline 446 and an interior surface 448 of the center bracket web portion 430. An x-offset ($x_o$) 442 may be defined as the horizontal distance of a protrusion 412a-d from the centerline 446. A y-offset ($y_o$) 444 may be defined as the vertical distance of a protrusion 412a-d from the interior surface 448.

In some embodiments, the protrusions 412a-d may have symmetrical offsets 442, 444. For example, in the example depicted in FIG. 5, the x-offset ($x_o$) 442 of the second protrusion 412b may be mirrored on the centerline 446 such that the magnitude of the x-offset ($x_o$) 442 from the centerline 446 for the first protrusion 412a and the second protrusion 412b are equal. Furthermore, the offsets 442, 444 for protrusions 412a-d on each center bracket leg portion 426, 428 may be mirrored. In other embodiments, each protrusion 412a-d may be defined by its own x-offset ($x_o$) 442 and y-offset ($y_o$) 444.

Figure 6:
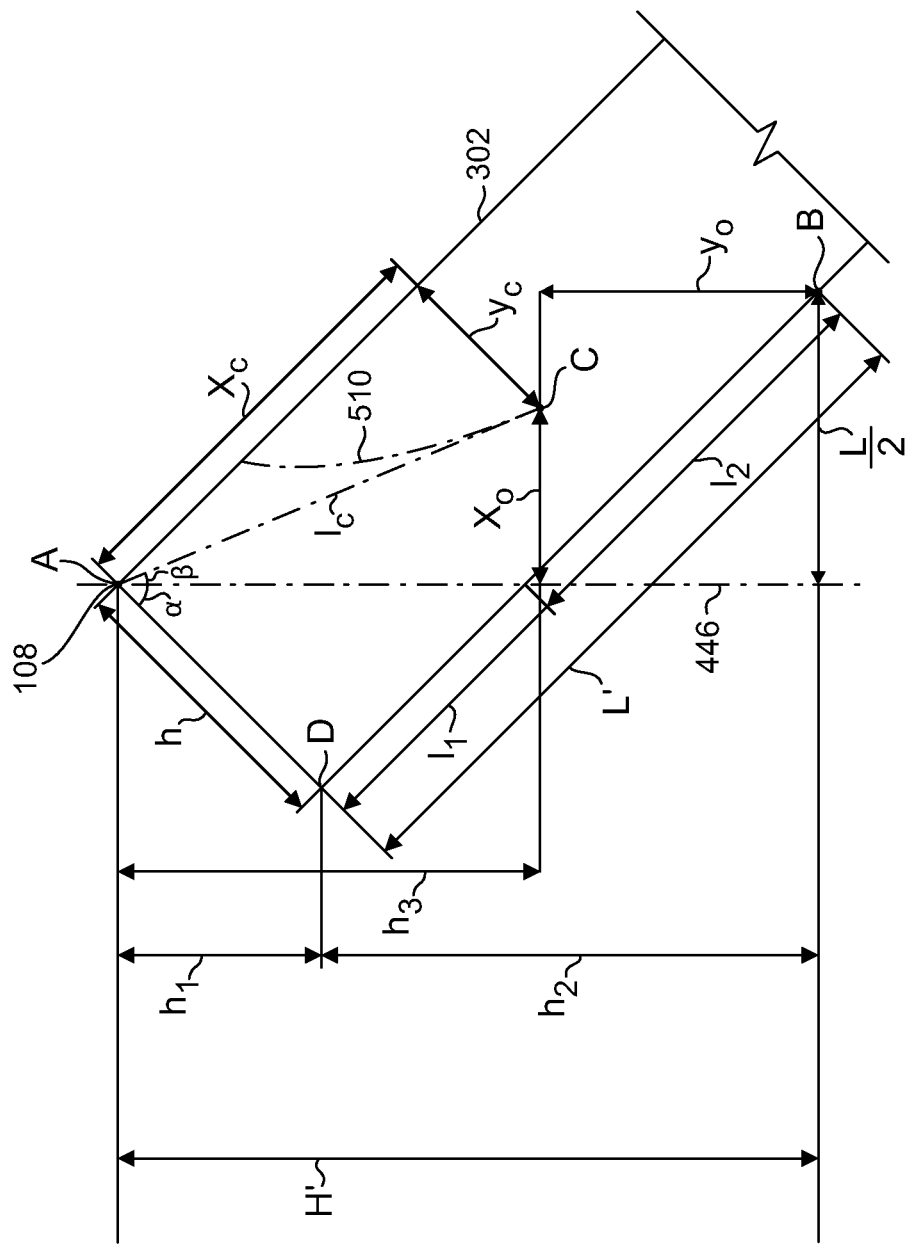
FIG. 6 illustrates the geometry of the bracket assembly for determining the curvature of the arcuate guide slots of the first bracket and second bracket.
Figure 7:
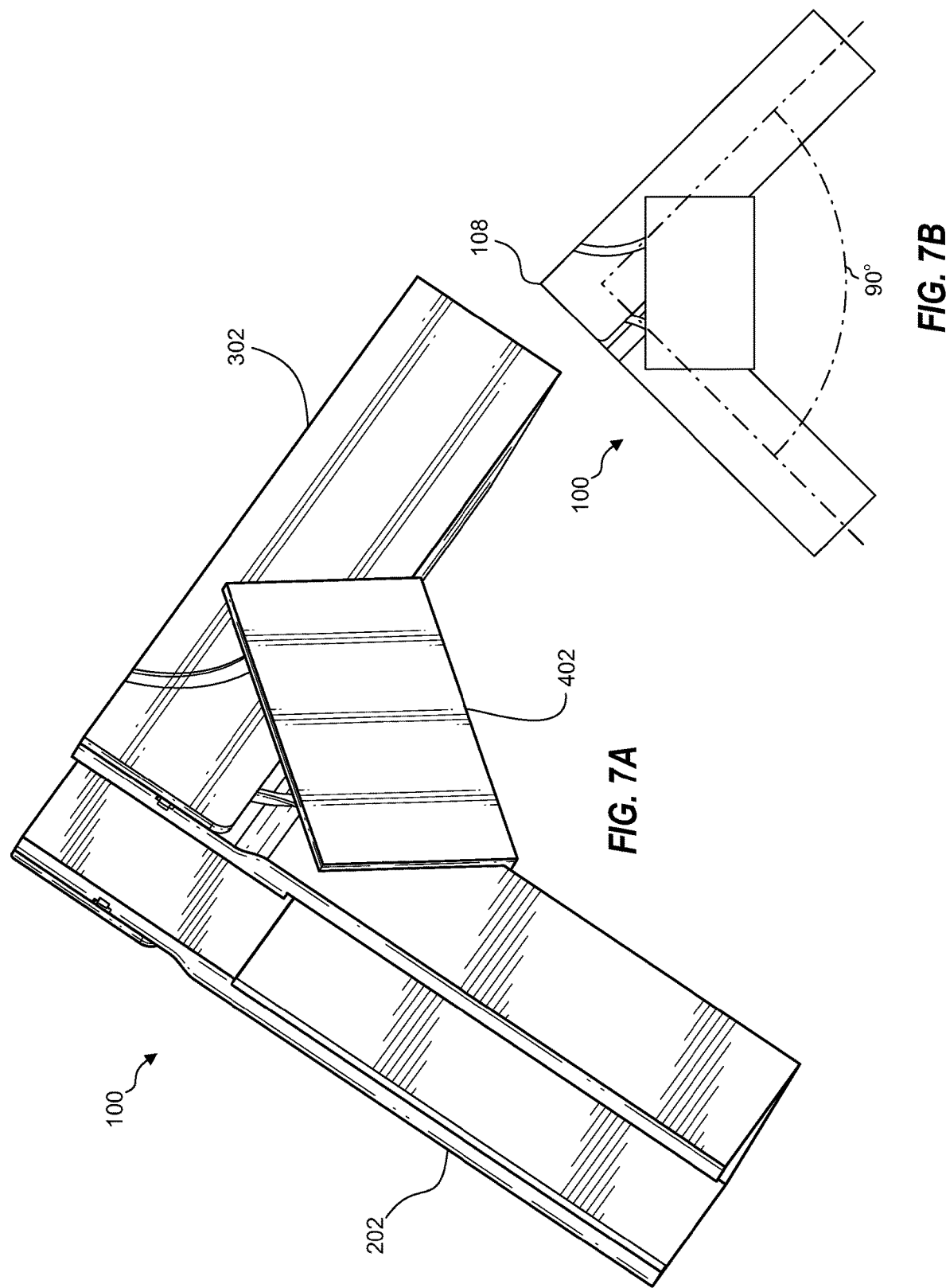
FIG. 7A is a top perspective view of the bracket assembly adjusted to an angle (θ) of 90 degrees.
FIG. 7B is a front side elevational view of the bracket assembly adjusted to an angle (θ) of 90 degrees.
Figure 8:
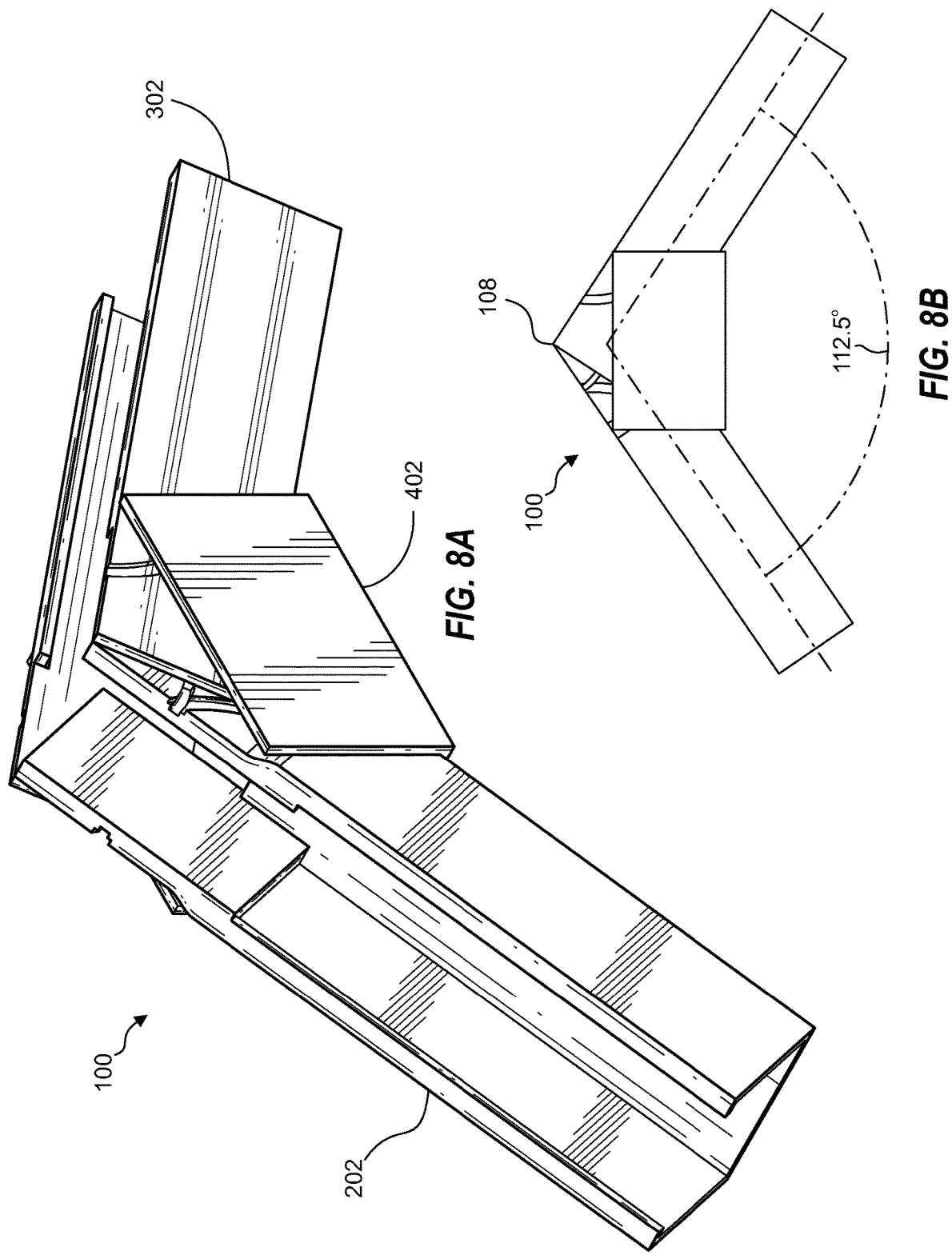
FIG. 8A is a top perspective view of the bracket assembly adjusted to an angle (θ) of 112.5 degrees.
FIG. 8B is a front side elevational view of the bracket assembly adjusted to an angle (θ) of 112.5 degrees.
Figure 9:
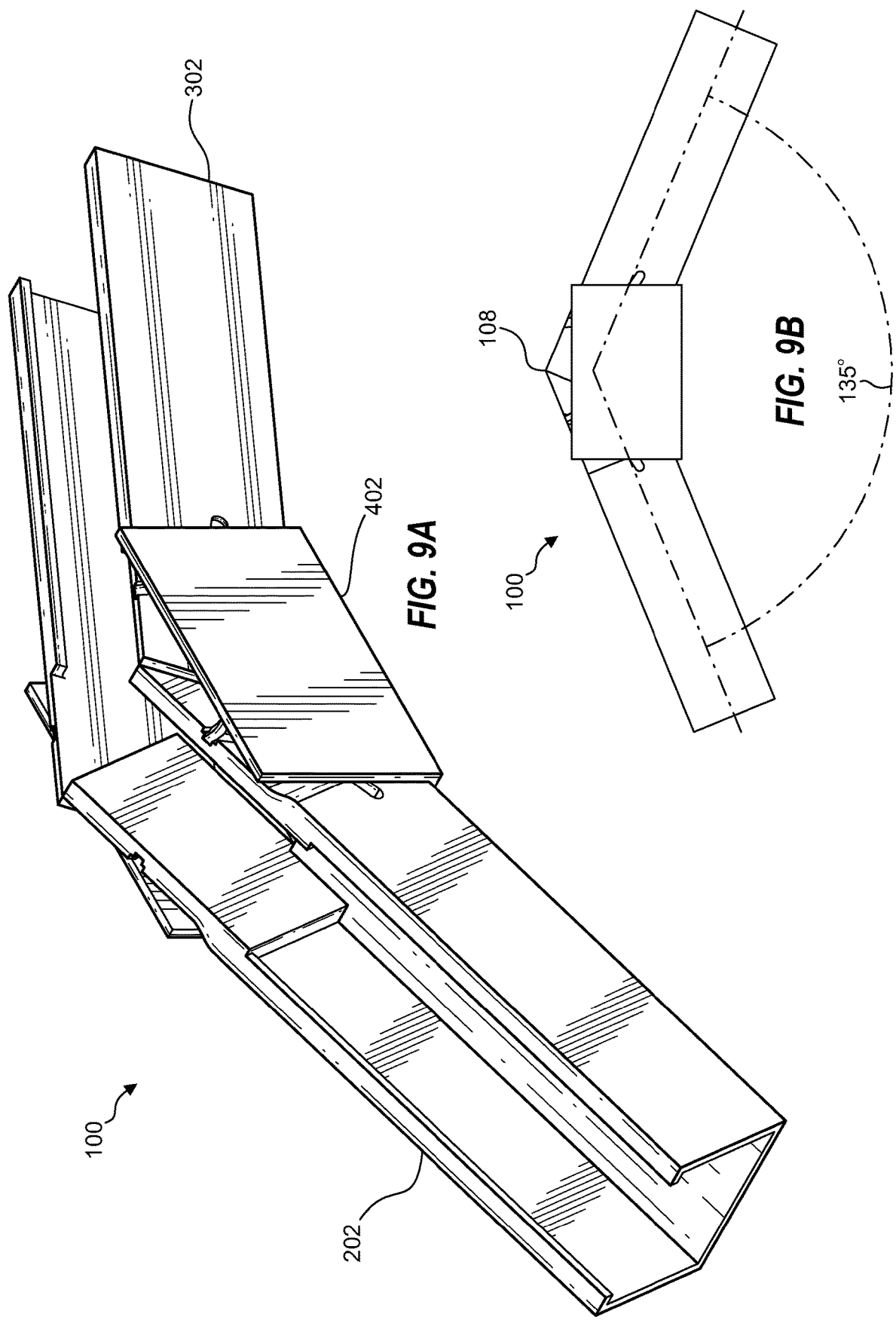
FIG. 9A is a top perspective view of the bracket assembly adjusted to an angle (θ) of 135 degrees.
FIG. 9B is a front side elevational view of the bracket assembly adjusted to an angle (θ) of 135 degrees.
Figure 10:
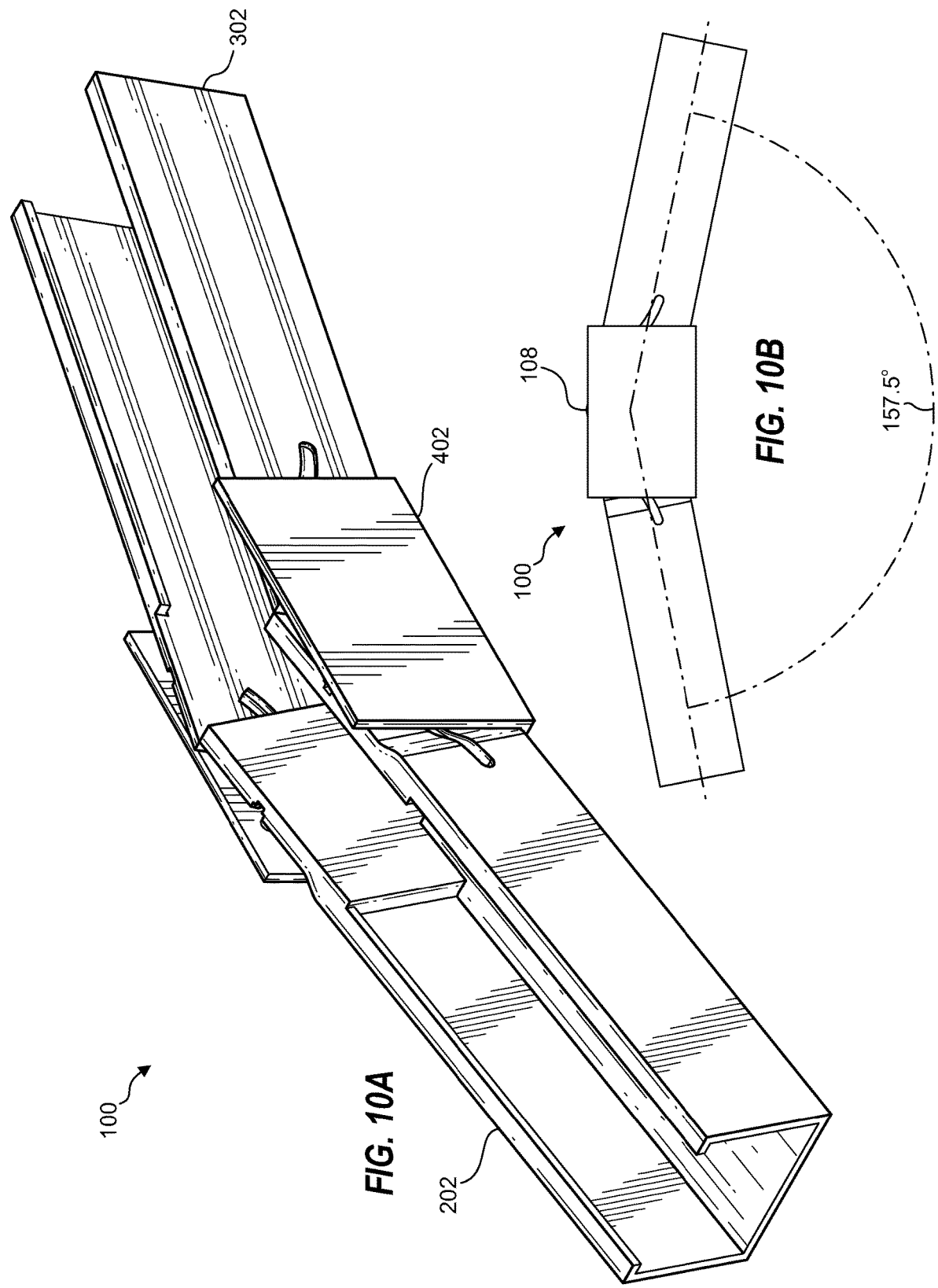
FIG. 10A is a top perspective view of the bracket assembly adjusted to an angle (θ) of 157.5 degrees.
FIG. 10B is a front side elevational view of the bracket assembly adjusted to an angle (θ) of 157.5 degrees.
Figure 11:
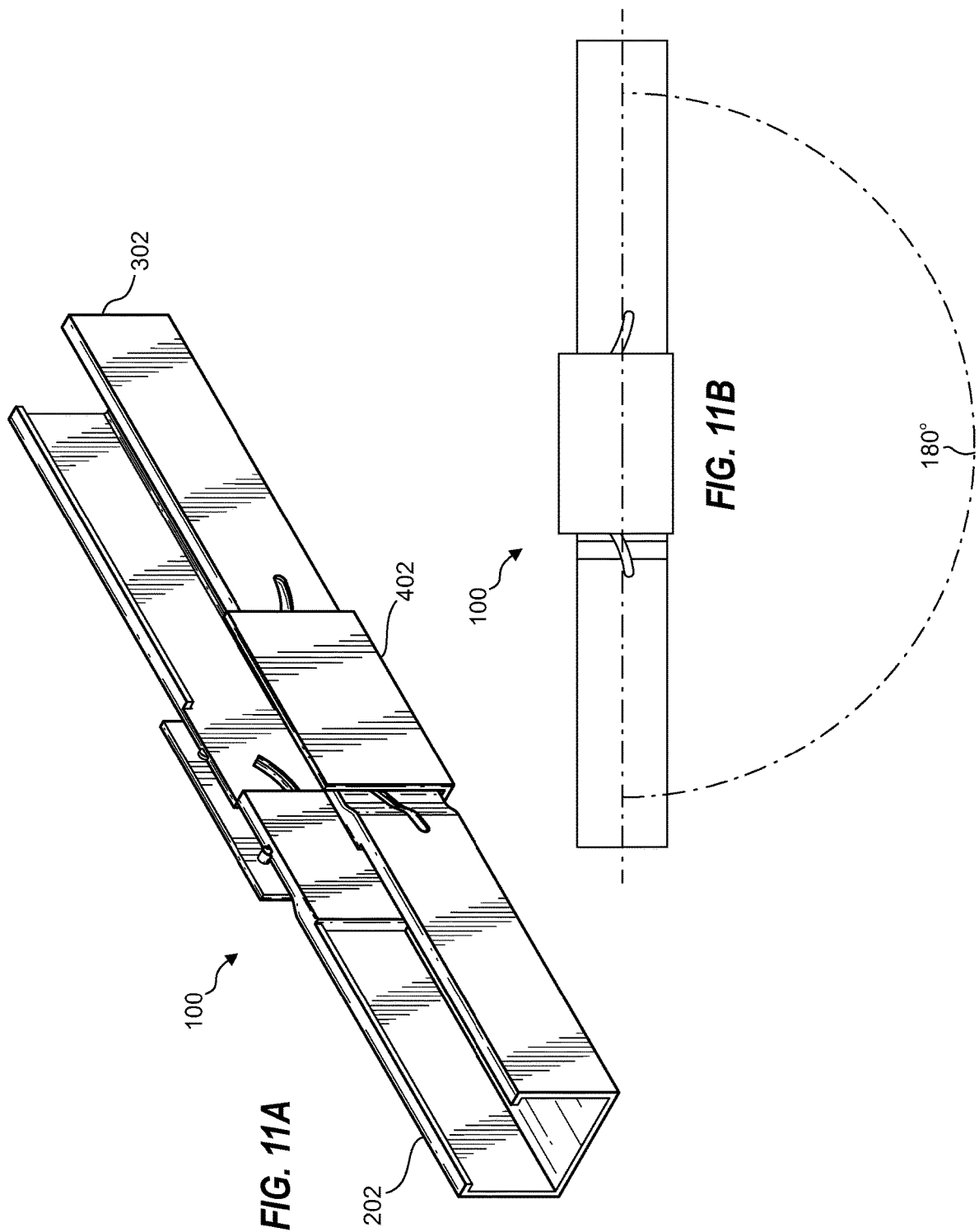
FIG. 11A is a top perspective view of the bracket assembly adjusted to an angle (θ) of 180 degrees.
FIG. 11B is a front side elevational view of the bracket assembly adjusted to an angle (θ) of 180 degrees.

FIG. 6 illustrates geometry of the bracket assembly 100 for determining the curvature 510 of the arcuate guide slots 210a-b, 310a-b of the first bracket 202 and second bracket 302. It should be noted that while the second bracket 302 is shown in FIG. 6, the same procedures may be applied to the first bracket 202 to determine the curvature 510 of the first bracket arcuate guide slots 210a-b.

As described above, the arcuate guide slots 210a-b, 310a-b have a curvature 510 that ensures that while the first bracket 202 and the second bracket 302 pivot about a point of rotation 108, the center bracket longitudinal axis 106 may be maintained at substantially the same angle (α) 112a-b with respect to the first bracket longitudinal axis 102 as the center bracket longitudinal axis 106 is with respect to the second bracket longitudinal axis 104. Therefore, as the angle (θ) 110 between the first bracket 202 and the second bracket 302 changes, the center bracket web portion 430 remains oriented in the same plane.

In FIG. 6, point A corresponds to the point of rotation 108 of the bracket assembly 100. Point B is the location on the second bracket 302 where the center bracket web portion 430 makes contact with the second bracket 302 for a given angle (θ) 110. Point C is the location on a leg portion of the second bracket 302 where the center bracket protrusion 412c interfaces with the second bracket 302 for a given angle (θ) 110. Point B and point C will vary with the angle (θ) 110.

It should be noted that the center bracket 402 may be defined with certain fixed dimensions, as described in connection with FIG. 5. For example, the length (L) 450 of the center bracket 402 may be defined. Also, the x-offset ($x_o$) 442 and y-offset ($y_o$) 444 of the protrusions 412 may also be defined. Furthermore, it is assumed that the top and bottom edges of the second bracket 302 are parallel and the lateral edge of the second bracket 302 is perpendicular to the top and bottom edges.

The curvature 510 of the arcuate guide slots 210a-b, 310a-b may be determined using one or more approaches. In one approach, the curvature 510 of a given arcuate guide slot 310a-b may be defined by three points. In this approach, an angle (θ) 110 is chosen and the protrusion 412c location at point C is determined based off of the defined geometry. In a first step, the centerline 446 is located at Point A and oriented to the lateral edge of the second bracket 302 based on α, where $$\alpha = 90° - \theta/2. \quad (1)$$

It should be noted that the centerline 446 shown in FIG. 6 corresponds to the centerline 446 of the center bracket 402.

In a second step, the location of point B may be determined. Half of the center bracket length (L/2) touches the edge of the second bracket 302 while being perpendicular to the centerline 446.

In a third step, the location of point C may be determined. The x-offset ($x_o$) 442 may be perpendicular to the centerline 446. The y-offset ($y_0$) 444 may be located at point B parallel to the centerline 446. The coordinates $x_c$ and $y_c$ of point C are now determined for the given angle (θ) 110.

In a fourth step, this process may be repeated to obtain coordinates $x_c$ and $y_c$ of point C for two additional angles (θ) 110. For example, coordinates $x_c$ and $y_c$ of point C may be determined for B at 90°, 135° and 180°.

In a fifth step, the curvature 510 may be determined according to the three different points C. The curvature 510 may be a circular arc which passes through each of the three determined points C.

In another approach, the curvature 510 may be determined according to defined geometry. In this approach, the second bracket 302 has a height (h). The centerline 446 may be located at point A for a given angle (θ) 110, as described above, and α is defined according to Equation (1). Point D is the corner opposite point A on the lateral edge of the second bracket 302. The distance ($l_1$) from point D to the intersection with the centerline 446 is $$l_1 = h \tan \alpha \quad (2)$$

and the distance ($l_2$) along the second bracket web portion from point B to the intersection with the centerline 446 is $$l_2 = \frac{L}{2} \cdot \frac{1}{\cos\alpha}. \quad (3)$$

The total distance (L') from point B to the corner opposite point A on the lateral edge of the second bracket 302 may be defined as $$L' = l_1 + l_2. \quad (4)$$

The vertical distance ($h_1$) from point A to point D is $$h_1 = h \cos \alpha \quad (5)$$

and the vertical distance ($h_2$) from point B to point D is $$h_2 = L' \sin \alpha. \quad (6)$$

Therefore, the total vertical distance (H') from point A to point B is $$H' = h_1 + h_2. \quad (7)$$

The vertical distance ($h_3$) from point A to point C (the location of the protrusion 412c on the second bracket 302 for B 110) is $$h_3 = H' - y_o \quad (8)$$

where $y_o$ is the y-offset ($y_o$) 444 for a center bracket protrusion 412c.

The total distance ($l_c$) from point A to point C is $$l_c = \sqrt{h_3^2 + x_o^2}. \quad (9)$$

The angle (β) between the centerline 446 and the line segment between point A and point C is $$\beta = \arctan\left(\frac{x_O}{h_3}\right) \quad (10)$$

where $x_o$ is the x-offset ($x_o$) 442 for the center bracket protrusion 412c.

The coordinates ($x_c$, $y_c$) of point C oriented along the second bracket longitudinal axis 104 may be determined as $$x_c = l_c \sin(\alpha + \beta) \quad (11)$$

$$y_c = l_c \cos(\alpha + \beta) \quad (12)$$

Equations (1)-(12) provide the coordinates ($x_c$, $y_c$) for the curvature 510 of the arcuate guide slot 310a for any angle (θ) 110 in a range of angles (θ) 110.

FIG. 7A and FIG. 7B illustrate an example of the bracket assembly 100 adjusted to an angle (θ) 110 of 90 degrees. It should be noted that in this configuration, the bracket assembly 100 may accommodate a 90-degree roof peak angle.

FIG. 8A and FIG. 8B illustrate an example of the bracket assembly 100 adjusted to an angle (θ) 110 of 112.5 degrees. It should be noted that in this configuration, the bracket assembly 100 may accommodate a 112.5-degree roof peak angle.

FIG. 9A and FIG. 9B illustrate an example of the bracket assembly 100 adjusted to an angle (θ) 110 of 135 degrees. It should be noted that in this configuration, the bracket assembly 100 may accommodate a 135-degree roof peak angle.

FIG. 10A and FIG. 10B illustrate an example of the bracket assembly 100 adjusted to an angle (θ) 110 of 157.5 degrees. It should be noted that in this configuration, the bracket assembly 100 may accommodate a 157.5-degree roof peak angle.

FIG. 11A and FIG. 11B illustrate an example of the bracket assembly 100 adjusted to an angle (θ) 110 of 180 degrees. It should be noted that in this configuration, the bracket assembly 100 may accommodate a 180-degree (i.e., flat) roof peak angle.

Figure 12:
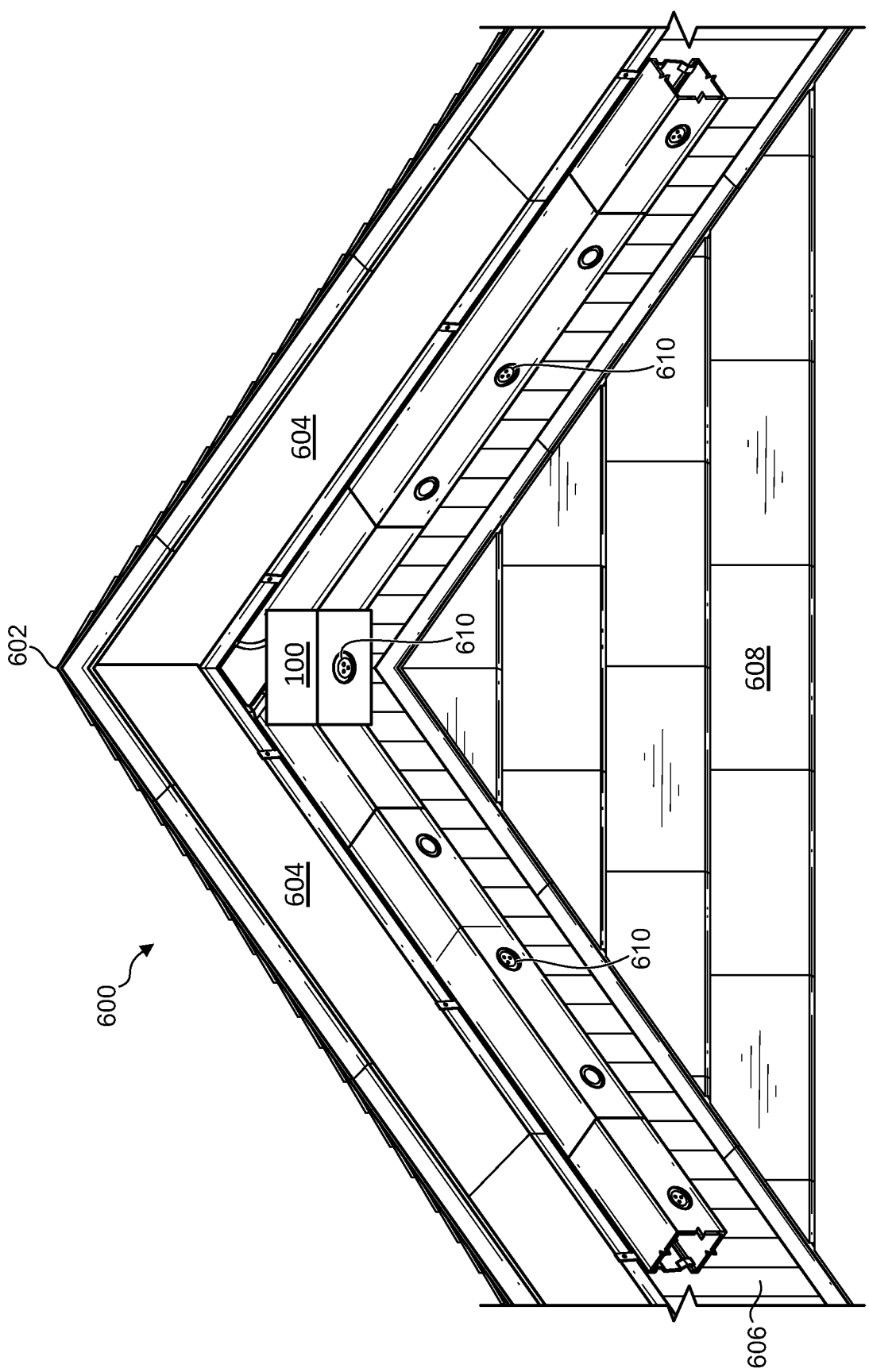
FIG. 12 illustrates an example of the bracket assembly in an installed configuration on a roof.

FIG. 12 illustrates an example of the bracket assembly 100 in an installed configuration on a roof 600. The roof 600 may have a peak 602 where two planes of the roof 600 meet at an angle.

In some embodiments, the roof 600 may have one or more overhangs (e.g., eaves). For example, the roof 600 may project out from a wall 608. The soffit 606 of the roof is the underside of the roof 600 that meets the wall 608. The fascia 604 is the vertical component of the roof 600 that meets the soffit 606.

The bracket assembly 100 may attach to the roof 600. For example, the bracket assembly 100 may be adjusted to accommodate the angle of the peak 602. In this example, the roof peak angle may be 90 degrees. It should be noted that because of the arcuate guide slots 210a-b, 310a-b of the bracket assembly 100, the center bracket web portion 430 remains parallel to the ground despite changes in the angle (θ) 110 of the bracket assembly 100.

In some embodiments, one or more mounting brackets 700 may attach to a lip of the fascia 604 where the fascia 604 meets the soffit 606. The bracket assembly 100 may then attach to the one or more mounting brackets. An example of a mounting bracket 700 used to mount the bracket assembly 100 is described in connection with FIG. 14.

In some other embodiments, a mounting bracket may attach to the roof 600 via a mechanical fastener (e.g., screw) and/or an adhesive fastener. The bracket assembly 100 may then attach to the mounting bracket.

The bracket assembly 100 may be shaped to interface with one or more additional brackets. For example, the first bracket 202 and/or second bracket 302 may be shaped to interface with an adjacent bracket. In some embodiments, the first bracket 202 and/or second bracket 302 may be shaped to couple with part of an adjacent bracket via a press fit or slide fit.

One or more lights 610 may be installed on the bracket assembly 100 and/or the additional brackets. For example, a light 610 (e.g., LED light) may be mounted in the opening 440 of the center bracket web portion 430. The wires of the one or more lights 610 may be housed in the interior cavity of the bracket assembly 100 and additional brackets.

Figure 13:
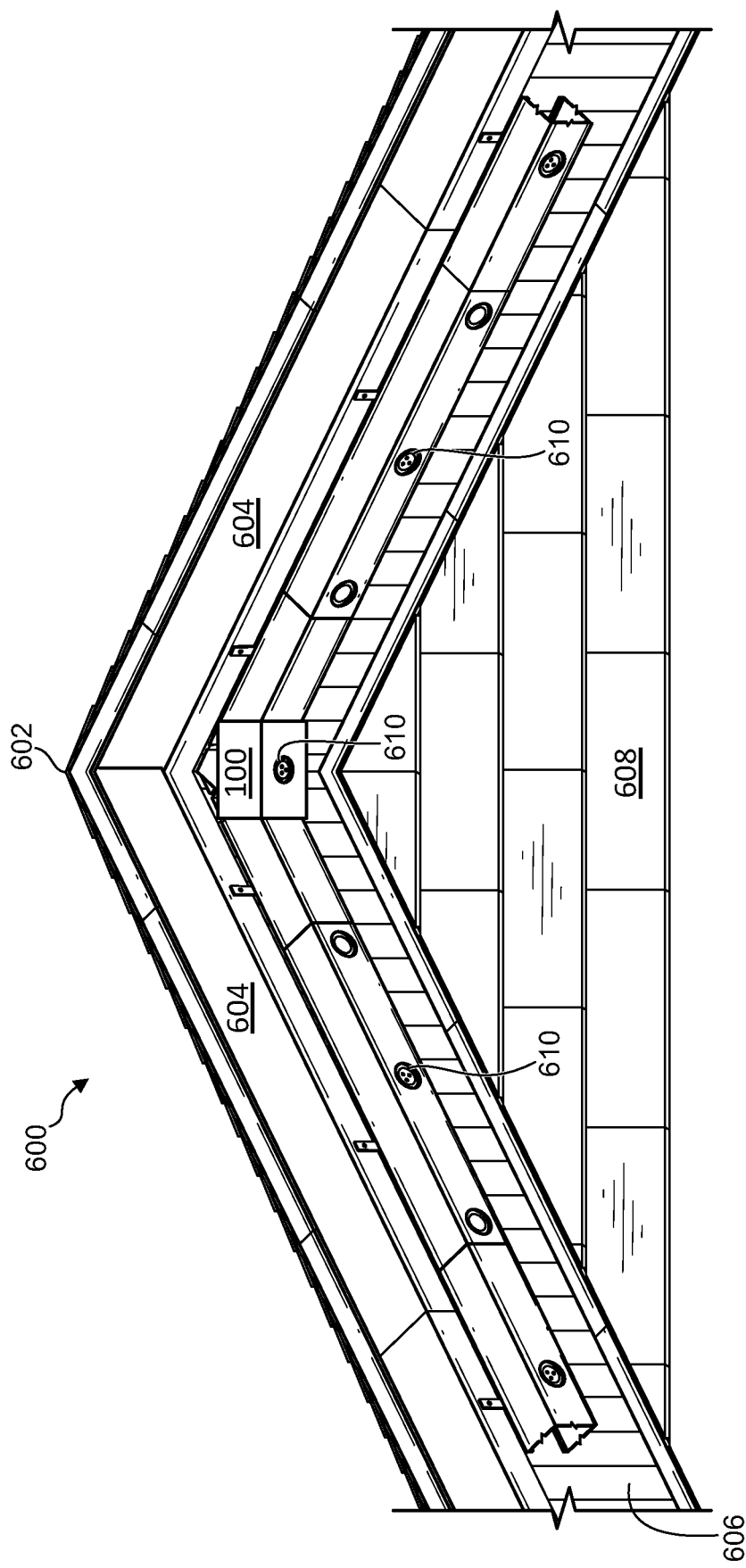
FIG. 13 illustrates another example of the bracket assembly in an installed configuration on a roof.

FIG. 13 illustrates another example of the bracket assembly 100 in an installed configuration on a roof 600. The bracket assembly 100 may be mounted on the roof 600 as described in connection with FIG. 12. However, this example illustrates a roof 600 with a flatter roof peak 602 than was depicted in FIG. 12. For example, the roof peak 602 may have an angle of 135 degrees. The bracket assembly 100 may be adjusted to accommodate this angle without disassembly. The bracket assembly 100 may then be installed on the roof 600 as described in connection with FIG. 12.

Figure 14:
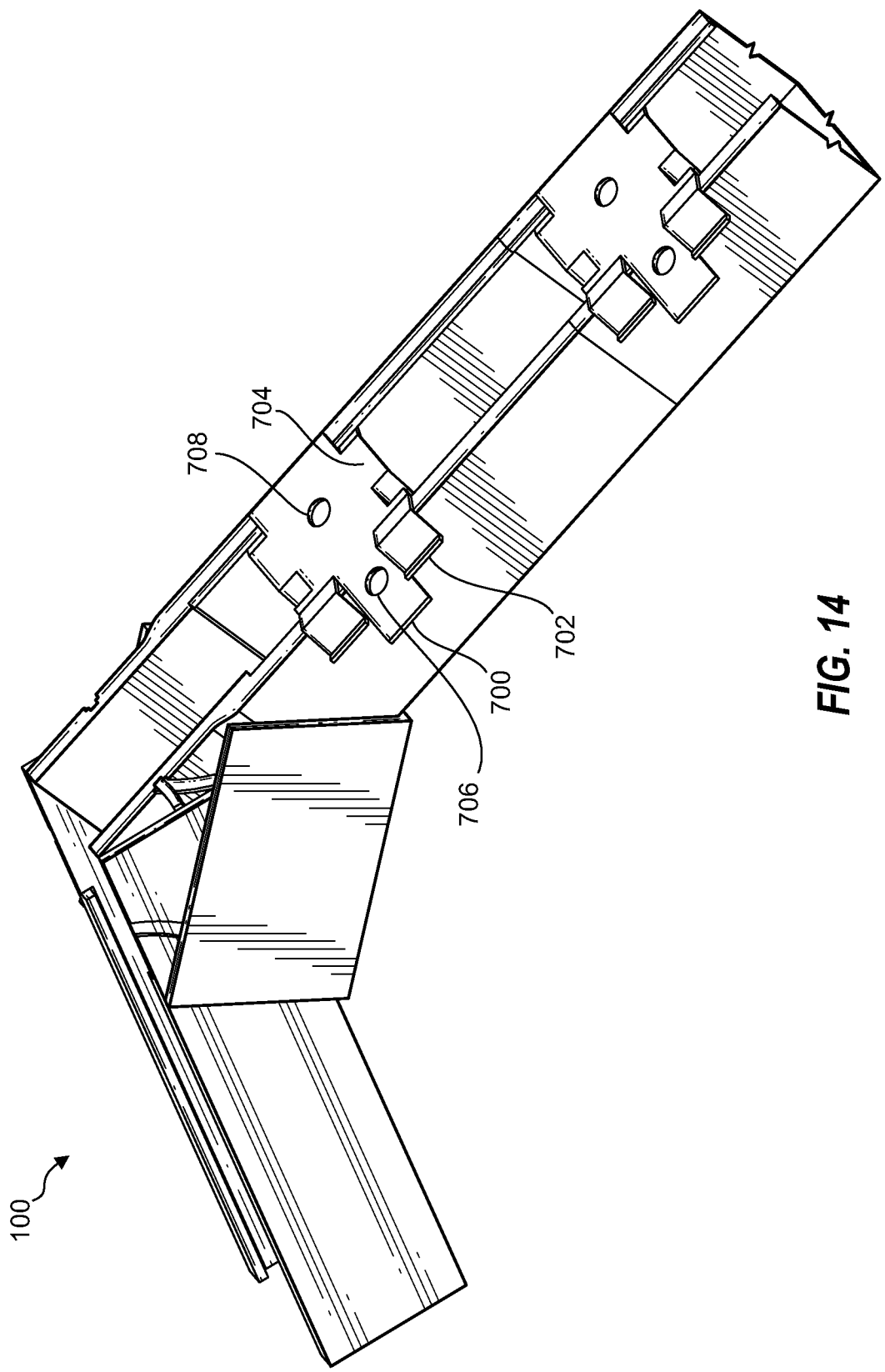
FIG. 14 illustrates an example of a mounting bracket that may be used to attach a bracket assembly to a roof.

FIG. 14 illustrates an example of a mounting bracket 700 that may be used to attach a bracket assembly 100 to a roof 600. The mounting bracket 700 may include a clip portion 702 shaped and positioned to attach to the fascia 604 of the roof 600.

The mounting bracket 700 may also include a bracket assembly mounting portion 704 shaped and positioned to attach to the bracket assembly 100. For example, tabs on the bracket assembly mounting portion 704 may be shaped to slide over and engage flanges on the leg portions of the first bracket 202 and/or second bracket 302 of the bracket assembly 100. The bracket assembly mounting portion 704 may hold the bracket assembly 100 in position when installed on the roof 600.

In some embodiments, the mounting bracket 700 may (optionally) include one or more holes 706, 708 to further secure the mounting bracket 700 to the roof 600. For example, the mounting bracket 700 may include a first hole 706 located in the clip portion 702. The first hole 706 may be shaped to accommodate a screw that is inserted into the fascia 604 of the roof 600. The mounting bracket 700 may include a second hole 708 located in the bracket assembly mounting portion 704. The second hole 708 may be shaped to accommodate a screw that is inserted into the soffit 606 of the roof 600. Thus, the first and the second brackets 202, 302 are shaped to engage a mounting bracket 700, and the mounting bracket 700 is shaped to attach to a roof overhang (e.g., a soffit or fascia).

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A bracket assembly, comprising:
a first bracket having a first bracket longitudinal axis and having a first arcuate groove on a first leg portion and a second arcuate groove on a second leg portion;
a second bracket having a second bracket longitudinal axis and having a first protrusion on a first leg portion and a second protrusion on a second leg portion, wherein the first protrusion is positioned and shaped to interface with the first arcuate groove and the second protrusion is positioned and shaped to interface with the second arcuate groove to allow the first bracket longitudinal axis and the second bracket longitudinal axis to pivot over a range of angles about a point of rotation in an assembled configuration, wherein the point of rotation is an equal distance from at least two distinct points along a curvature of the first arcuate groove; and
a center bracket having a center bracket longitudinal axis and having two protrusions on a first leg portion and two protrusions on a second leg portion, wherein the protrusions of the center bracket are positioned and shaped to interface with arcuate guide slots on the first bracket and second bracket, wherein curvatures of the arcuate guide slots are positioned and shaped to maintain the center bracket longitudinal axis at substantially a same angle with respect to the first bracket longitudinal axis as the center bracket longitudinal axis is with respect to the second bracket longitudinal axis over the range of angles between the first bracket and second bracket longitudinal axes in the assembled configuration, wherein the arcuate guide slots comprise a first arcuate guide slot and a second arcuate guide slot disposed on the first bracket, and wherein at least a portion of the first arcuate groove is positioned closer to the point of rotation along the first bracket longitudinal axis than the first arcuate guide slot, and wherein at least a portion of the second arcuate groove is positioned closer to the point of rotation along the first bracket longitudinal axis than the second arcuate guide slot.

2. The bracket assembly of claim 1, wherein the curvature of the first arcuate groove of the first bracket comprises the circular arc with a radius centered at a pivot corner of the first bracket, the pivot corner of the first bracket located opposite a first bracket web portion.

3. The bracket assembly of claim 2, wherein the first protrusion of the second bracket is located from a pivot corner of the second bracket at a distance corresponding to the radius of the circular arc such that the first protrusion may slide within the first arcuate groove when the first bracket and the second bracket are in the assembled configuration, wherein the pivot corner of the second bracket is located opposite a second bracket web portion.

4. The bracket assembly of claim 2, wherein the first protrusion of the second bracket comprises an arcuate protrusion having the radius of the circular arc of the first arcuate groove of the first bracket.

5. The bracket assembly of claim 1, wherein a first protrusion of the center bracket interfaces with an arcuate guide slot on the first leg portion of the first bracket, a second protrusion of the center bracket interfaces with an arcuate guide slot on the second leg portion of the first bracket, a third protrusion of the center bracket interfaces with an arcuate guide slot on the first leg portion of the second bracket, and a fourth protrusion of the center bracket interfaces with an arcuate guide slot on the second leg portion of the second bracket.

6. The bracket assembly of claim 1, wherein the curvatures of the arcuate guide slots are further positioned and shaped to maintain a center bracket web portion of the center bracket in contact with web portions of the first bracket and second bracket while the first bracket and the second bracket pivot with respect to each other within the range of angles when the first bracket and the second bracket are in the assembled configuration.

7. The bracket assembly of claim 1, wherein at least a portion of the first bracket and second bracket comprise a C-shaped channel.

8. The bracket assembly of claim 1, wherein the range of angles about the point of rotation comprise substantially 90 degrees to substantially 180 degrees, wherein at substantially 90 degrees the first bracket longitudinal axis and the second bracket longitudinal axis are substantially perpendicular and at substantially 180 degrees the first bracket longitudinal axis and the second bracket longitudinal axis are substantially coaxial.

9. The bracket assembly of claim 1, wherein the center bracket comprises one or more openings shaped to receive one or more lights.

10. The bracket assembly of claim 1, wherein the first bracket and the second bracket are shaped to engage a mounting bracket, the mounting bracket shaped to attach to a roof overhang.

11. The bracket assembly of claim 1, wherein in an installed configuration, the first bracket and the second bracket are adjustable to accommodate an angle of a peak of a roof structure.

12. The bracket assembly of claim 1, wherein the first leg portion and the second leg portion of the first bracket comprise an offset to define a narrowed portion of the first bracket to accommodate the first leg portion and the second leg portion of the second bracket.

13. The bracket assembly of claim 12, wherein the protrusions of the center bracket comprise a first set of two of the protrusions and a second set of two of the protrusions, wherein first set of two of the protrusions of the center bracket are longer than the second set of two of the protrusions to interface with the arcuate guide slots on the offset of the first bracket.

14. The bracket assembly of claim 1, wherein the center bracket is shaped to interface with the arcuate guide slots on an exterior surface of the first bracket and the second bracket, wherein the protrusions of the center bracket are located on an interior of the center bracket.

15. The bracket assembly of claim 1, wherein the center bracket is shaped to interface with the arcuate guide slots on an interior surface of the first bracket and the second bracket, wherein the protrusions of the center bracket are located on an exterior of the center bracket.

16. A method using the bracket assembly of claim 1, the method comprising:
  pivoting the first bracket and the second bracket about the point of rotation in the assembled configuration to an angle within the range of angles; and
  maintaining, by the curvatures of the arcuate guide slots, the center bracket longitudinal axis at substantially the same angle with respect to the first bracket longitudinal axis as the center bracket longitudinal axis is with respect to the second bracket longitudinal axis over the range of angles between the first bracket and second bracket longitudinal axes.

17. The method of claim 16, further comprising:
  altering the angle between the first bracket and the second bracket within the range of angles without disassembling the first bracket, the second bracket and the center bracket.

* * * * *